ns S. Henderson, Dean Sandford and Robert E. Strauss

United States Patent
Knights

[15] 3,686,287
[45] Aug. 22, 1972

[54] HYDROCARBON OLEFIN OXIDATION

[72] Inventor: Evord F. Knights, Fullerton, Calif.

[73] Assignee: Union Oil Company of California, Los Angeles, Calif.

[22] Filed: Nov. 12, 1968

[21] Appl. No.: 775,124

[52] U.S. Cl ..................... 260/497 A, 260/410.9 N
[51] Int. Cl. ............................................. C07c 67/04
[58] Field of Search ............... 260/497 A, 410.9, 476

[56] References Cited

UNITED STATES PATENTS

| | | | |
|---|---|---|---|
| 3,190,912 | 6/1965 | Robinson | 260/497 A |
| 3,471,532 | 10/1969 | Young | 260/497 A |
| 3,444,189 | 5/1969 | Olivier | 260/497 |

FOREIGN PATENTS OR APPLICATIONS

| | | | |
|---|---|---|---|
| 1,191,366 | 4/1965 | Germany | 260/497 A |

OTHER PUBLICATIONS

Handbook of Chemistry and Physics, 47th Ed., pg. D-132.

*Primary Examiner*—Lorraine A. Weinberger
*Assistant Examiner*—Richard D. Kelly
*Attorney*—Milton W. Lee, Richard C. Hartman, Lannas S. Henderson, Dean Sandford and Robert E. Strauss

[57] ABSTRACT

Hydrocarbon olefins are oxidized to unsaturated esters including vinyl esters by vapor phase oxidation in the presence of a heterogeneous catalyst comprising a Group VIII noble metal, a nitrogen oxide as the oxidant and an aliphatic carboxylic acid. In a typical example, ethylene is oxidized to vinyl acetate by contacting ethylene with a vapor mixture of oxygen, nitric oxide and acetic acid in the presence of a palladium containing catalyst. Products of the oxidation are useful monomers.

7 Claims, No Drawings

HYDROCARBON OLEFIN OXIDATION

DESCRIPTION OF THE INVENTION

Hydrocarbon olefins can be oxidized to unsaturated esters using a Group VIII metal catalyst. The oxidation is practiced commercially in homogeneous catalysis with an acetic acid solution of a salt of the Group VIII metal and a cupric salt as a redox agent. The reaction medium is highly corrosive and requires titanium lined vessels. Oxidation byproducts such as oxalic acid often precipitate the cupric redox agent, further complicating the processing. Attempts to avoid these difficulties by adapting the oxidation to vapor phase processing have met with only limited success because of the low reactivity of the oxidation with a heterogeneous catalyst and redox agent.

It has now been found that the hydrocarbon olefins can be oxidized to unsaturated esters with a heterogeneous Group VIII metal containing catalyst using nitrogen dioxide or tetroxide as the oxidant or using a mixture of oxygen with nitric oxide or the aforementioned nitrogen dioxide and tetroxide. Surprisingly, it has been found that the oxidation products are unsaturated esters in contrast to the reported production of glycol diacetate from homogeneous catalysis of ethylene oxidation using a liquid phase with nitric acid and a Group VIII metal salt; see U.S. Pat. No. 3,349,118. A remarkably high degree of reactivity has also been observed in the oxidation of this invention in contrast to the reported low reactivity in liquid phase in the absence of redox agents; see U.S. Pat No. 3,384,669.

The oxidation is performed under relatively mild conditions including temperatures from about 30° to 300°C. and pressures from 0.1 to about 1,000 atmospheres. The oxidation rate is relatively rapid and space velocities from about 6 to about 6,000 vapor volumes per catalyst volume per hour can be employed. The catalyst can be distended on a suitable inert carrier or support in the manner described hereinafter and the heterogeneous contacting can be performed using a suspended catalyst such as a disperse phase suspension or a fluidized bed of powdered catalyst or the catalyst can be contacted as a fixed bed in the oxidation reactant. Products of the oxidation are recovered from the vapor effluent of the reactor in the conventional manner, e.g., by distillation.

The oxidation is performed on hydrocarbon olefins. Suitable olefins include those having from two to about 15 carbons with at least one hydrogen on an unsaturated carbon. These olefins correspond to the following structure:

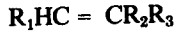

$$R_1HC = CR_2R_3$$

wherein $R_1$, $R_2$, and $R_3$ are hydrogen or the same or different alkyl, cycloalkyl or aryl radicals. Examples of suitable reaction olefins include ethylene, propylene, butene-1, butene-2, isobutylene, pentene-1, pentene-2, 2-isopropylbutene-2, cyclovinylcyclobutane, allylcyclopentane, butenylcyclopentane, vinylcyclohexane, 1,2-diphenylethylene, allylcyclohexane, styrene, p-methylstyrene, alpha-methylstyrene, hexene-1, hexene-2, dimethyl-2-butene, 2-ethyl-1-butene, 3-hexene, 3-ethyl-2-pentene, 2,5-dimethyl-3-hexene, 2-methylpropene, 2-methyl-2-hexene, diphenylethylene, stilbene, 3-methyl-2-pentene, styrene, isopropylethylene, isobutylethylene, diphenylpropene, propenylbenzene, dimethyl-1-butene, vinylcycloheptane, allylcyclooctane, vinylnaphthalene, propenylnaphthalene, vinylindene, vinyl toluene, cumenyl butene, octene-1, octene-2, nonene, decene, undecene, dodecene, tridecene, tetradecene, pentadecene, hexadecene, etc. Of the preceding, the alpha olefins and the olefins having from two to about six carbons are preferred reactants and, of these, ethylene is most preferred.

The oxidants for the process comprise a nitrogen oxide, such as nitrogen dioxide or tetroxide that can be used alone or with oxygen or, when oxygen is also used as a oxidant, nitric oxide. Of these, the preferred oxidant comprises a mixture of oxygen and nitric oxide.

The unsaturated ester product is the ester of the particular alkanoic acid used as a coreactant with the olefin. Alkanoic acids having from two to about 16 carbons can be used; preferably, acids having from two to 10 carbons are used; and, most preferably, acetic acid is used. Examples of suitable acids include acetic, propionic, butyric, isobutyric, pivalic, valeric, isovaleric, caproic, enanthic, caprylic, 2-ethylhexanoic, perlargonic, capric, hendecenoic, lauric, tridecanoic, myristic, pentadecylic, palmitic acids, etc. The acid can be vaporized and admixed with the reactant gas mixture of olefin, nitrogen oxide and, optionally, oxygen by any suitable method, e.g., by passing the gas mixture through a hot reservoir of the acid to vaporize or entrain a sufficient proportion of the acid in the mixture.

The catalyst is a Group VIII noble metal containing catalyst and can contain a metal of the platinum subgroup, i.e., platinum, iridium or osmium, or a metal of the palladium subgroup, i.e., palladium, rhodium or ruthenium. Palladium is preferred. The Group VIII noble metal can be employed in an amount between about 0.001 and 5.0 weight percent of the catalyst composition and can be introduced into the reaction zone distended on a suitable inert support in the form of a finely divided metal, oxide, salt or complex. Examples of suitable metal containing sources are the oxides, halides, sulfates, nitrates and salts of the lower $C_1$–$C_5$ carboxylates such as palladium oxide, palladium chloride, rhodium oxide, rhodium acetate, ruthenium dioxide, ruthenium bromide, osmium tetroxide, osmium trifluoride, iridium dioxide, iridium butyrate, palladium acetate, iridium nitrate, palladium sulfate, palladium dichloride, platinum propionate, rhodium acetate, iridium pivalate, etc.

The Group VIII noble metals readily form complexes with various ligands such as the nitroso, halo or biphyllic ligand complexes and any of these can be used as the noble metal catalyst source. Complexes involving ligands with two or more complexing sites spaced in sufficient proximity to form a ring structure with the metal are chelates and any chelate of a Group VIII noble metal and a conventional metal chelating agent can be used. Various chelates of Group VIII noble metals can be used such as the metal complexes with $C_4$ to $C_{15}$ aliphatic or aromatic 1,3-diketones such as acetylacetone, propionylacetone, butyrolacetone, nonanoylacetone, benzoylacetone, dibenzoylacetone, naphthoylacetone, etc.

Examples of suitable nitroso complexes include tris-triphenylphosphine nitroso rhodium, tris-triphenylarsine nitroso rhodium, tris-triphenylphosphine nitroso iridium, rhodium nitroso bromide, palladium nitroso chloride, etc. Examples of halo complexes include: potassium hexafluororuthenate, sodium hexachloroosmate, lithium hexachloroiridate, chloroplatinic acid, sodium fluoropallate, etc.

The oxidation is performed in heterogeneous vapor phase catalysis by employing the catalyst distended or supported on a suitable inert solid in the reaction zone. Any solid can be used as the support or carrier which is a solid and inert to the reaction under the oxidation conditions present in the reaction zone. Suitable solids include titania, zirconia, alumina, silica, etc. or a combination of these metal oxides.

Other examples include alumina, silica stabilized alumina containing from 1 to 15 percent silica as described in U.S. Pat. No. 2,437,532, the aluminum silicates, clay, naturally occurring or synthetically prepared zeolites such as chabazite, gnelenite or faujasite, as well as synthetic zeolites. The latter materials are partially dehydrated crystalline compositions of silica and alumina and contain quantities of one or more exchangeable cations such as sodium, potassium, hydrogen, magnesium, calcium, etc. The compositions and their preparation are described in U.S. Pat. Nos. 2,882,243 and 2,882,244. These compositions are characterized by crystal pores of relatively uniform pore diameters between about 5 and 14 Angstrom units. Several crystal forms of such molecular sieves are available and suitable for use herein as the carrier for the catalyst, redox agent and cocatalyst components of my invention including the X, Y, L, and J crystal types. The sieves can be treated prior to deposition of the aforementioned catalytic metals by ion exchanging the monovalent alkali metal cation with a divalent metal. Also the sieves can be "decationized" by ion exchange with an ammonium salt followed by heating to decompose the zeolitic ammonium ion and leave a hydrogen ion. Any of the aforementioned carriers can be impregnated with appropriate aqueous solutions of salts of the Group VIII noble metals, redox metal or nitrogen oxide salts, and the quinone or hydroquinone cocatalyst.

The catalyst particle size can vary over wide limits from about 0.5 inch to about 1 micron average diameter. The particle size selected depends on the type of solid-vapor contacting employed in the reaction zone. A disperse gas phase reaction would employ the very fine particles passing about a 325 mesh screen. Use of a fluidized bed reactor would require use of particles passing a 20 but retained on a 400 mesh screen. Packed bed reactors, which are preferred, would use the larger diameter particles having diameters from 0.05 to 0.5 inch, preferably from about 0.1 to 0.25 inch. The specific surface of the catalyst can also vary widely, from about 10 to 800 square meters per gram.

The noble group metal component of the catalyst when distended on a solid carrier can be employed in an amount from about 0.01 to about 25 weight percent of the final catalyst. Preferably the noble metal is employed in a concentration from about 0.5 to about 10 weight percent based on the final catalyst. The noble metal can be distended on the carrier by impregnation of the carrier with a solution of a salt, complex or chelate of the noble metal. The impregnation can be achieved by evaporating the solvent from the admixture of inert carrier and catalyst solution or by addition of a precipitating agent to form an insoluble salt or hydroxide of the noble metal. The catalyst is thereafter dried and can be used in the carbonylation.

The oxidation is performed at temperatures from about 30° to 300°C.; preferably from about 75° to 275°C.; and most preferably from about 125° to about 175°C. The oxidation is performed at pressures from about 0.1 to about 1,000 atmospheres, preferably from about 1 to about 500 atmospheres, and most preferably from 2 to about 20 atmospheres; the lower pressures being favored to insure that the reactants and/or products are present in a vapor state in the reaction zone. If desired, the reactants can be diluted with a suitable inert gaseous diluent, e.g., nitrogen, carbon dioxide, etc.

The oxidation is effected by passing a vapor mixture of the reactant olefin, the nitrogen oxide, alkanoic acid, and, optionally, oxygen, into contact with the noble metal containing catalyst. To preclude or minimize oxidation to byproducts such as carbonyls, e.g., acetaldehyde from ethylene, acetone from propylene, etc., the vapor mixture is preferably substantially anhydrous. Thus the vapor reactant mixture preferably contains less than 5 and most preferably less than 1 volume percent water vapor. This can be obtained by using anhydrous reactants or by introducing from 5 to 75 percent of the alkanoic acid reactant as its anhydride, e.g., acetic anhydride, propionic anhydride, butyric anhydride, etc. The reactants can be preheated to the desired reaction temperature to initiate the oxidation and thereafter the temperature of the reactants can be adjusted to control the temperature of the exothermic oxidation. Alternatively, or in supplement to this technique, cooling means can be provided in the reaction zone to maintain the reaction temperature such as indirect heat transfer means through which is circulated a cooling medium. Alternatively, a vaporizable inert liquid such as a halogenated hydrocarbon can be introduced to remove the exothermic heat by its vaporization.

The reactants can be introduced into the reaction zone in proportions comprising from about 1:10 to 10:1 parts by volume of the olefin vapor per part by volume of the nitrogen oxide. Similarly, the amount of alkanoic acid introduced can be varied from about 1:10 to about 10:1 parts by volume of the vaporized acid per volume of the nitrogen oxide. When oxygen is introduced, it is preferably introduced in approximately an equal volume ratio to the nitrogen oxide, e.g., volume ratios from about 2:1 to 1:2 parts by volume of oxygen per part by volume of the nitrogen oxide. As previously mentioned, the aforedescribed reactant gas mixture can be diluted if desired with suitable inert gaseous diluents that can comprise from 10 to about 90 volume percent of the gas introduced into the oxidation zone.

The reactants can be contacted with the catalyst with vapor space velocities from about 6 to about 6,000 volume per volume of catalyst per hour; preferably from about 10 to about 3,000 volumes per volume per hour and, most preferably from about 50 to about 600 volumes per volume per hour. As previously mentioned, this contacting can be effected in a suspension process with the finely divided catalyst particles which are suspended in a stream of the reactant vapors and, upon completion of the oxidation, are recovered therefrom by conventional processing, e.g., centrifuging or stratification. Similarly, the reactants can be contacted with the finely divided catalyst which can be maintained as a fluidized dense bed suspended in an upward stream of the gaseous reactants. Alternatively, the catalyst can be supported on relatively coarse solids having particle diameters from about 0.05 to about 0.5 inch which are maintained as a compact, fixed bed in a reaction zone through which the reactant vapors are passed and from which an effluent product gas stream is removed.

The effluent gas stream removed from the contacting zone can be cooled to separate the condensible liquids therefrom and the non-condensible liquids, e.g., inert gaseous diluent, oxygen, nitrogen oxide and any low boiling and unconverted hydrocarbon olefin, e.g., ethylene, propylene, butene, etc., can be separated from the condensed liquid and returned for further contacting in the oxidation zone. The liquid condensate can thereafter be distilled to separate its components and recover the product therefrom. Any unconverted liquid reactant such as the higher boiling olefins, i.e., those having more than about four carbons, can also be recovered and recycled to the oxidation zone for further contacting.

The following examples will illustrate a mode of practice of the invention and demonstrate results obtainable thereby.

EXAMPLE 1

The oxidation is performed at atmospheric pressure by equipping a 1-liter, round-bottom, three-necked flask with a heating mantle, a sintered glass gas inlet tube connected to a source of vapor reactants and a condenser packed with 70 milliliters of a catalyst comprising 5 weight percent palladium nitrate deposited on a solid support comprising 90 percent silica and 10 percent alumina. The flask is charged with acetic acid and heated to 85°–90°C. and the condenser is heated to 100°C. by passing steam through the jacket. Nitric oxide is admixed with a stream of ethylene and a stream of air and the resulting mixture is bubbled through the acetic acid in the flask while the displaced vapors from the flask are passed through the condenser and into contact with the catalyst contained therein. The gas effluent from the condenser is passed through several dry ice-cooled traps and then vented. The experiment is continued over an extended period of about 16 hours and the condensed products are analyzed to determine them to be a mixture of 82 percent vinyl acetate and 18 percent acetaldehyde.

When octene-1 is substituted for the ethylene, oxidation to octenyl acetate will occur.

EXAMPLE 2

The reaction is repeated by passing a mixture of ethylene at 200 milliliters per minute, air at 250 milliliters per minute, nitric oxide at 20 milliliters per minute and 40 milliliters of acetic acid per hour through a U-shaped reactor containing 240 milliliters of a catalyst comprising 2 percent palladium on a solid support. The solid support comprises 90 percent silica and 10 percent alumina. The products collected in the cooled traps are 60 percent vinyl acetate and 40 percent acetaldehyde.

The illustrated mode of practice can be readily applied to the oxidation of the other olefins or reaction with the other acids disclosed herein by the simple substitution of these for the ethylene and acetic acid described in the illustration. Similarly, the catalysts described in the preceding examples can be directly substituted with equivalent amounts of the other catalysts disclosed herein.

The preceding examples are therefore not to be construed as unduly limiting of the invention, but are intended only to illustrate the presently contemplated best mode of practice.

I claim:

1. The oxidation of hydrocarbon olefins having from two to about 15 carbons and having at least one hydrogen on an unsaturated carbon atom which comprises contacting a substantially anhydrous vapor mixture of the olefin, an alkanoic acid having from two to about 16 carbons and as the only oxidant therefor, nitrogen dioxide or tetraoxide, with a catalyst consisting of an inert solid support and, as the only catalytic component, a Group VIII noble metal, oxide, salt, nitroso or halo complex, or $C_4$ to $C_{15}$ aliphatic or aromatic 1,3-diketone chelate thereof, at a temperature from 30° to 300°C. and a pressure from 0.1 to 1,000 atmospheres to oxidize said olefin to an ethylenically unsaturated ester of said alkanoic acid.

2. The oxidation of claim 1 wherein said olefin is ethylene and said alkanoic acid is acetic acid.

3. The oxidation of claim 2 wherein said inert support is silica.

4. The oxidation of claim 3 wherein said silica contains a minor amount of alumina.

5. The oxidation of claim 1 wherein said Group VIII noble metal is palladium.

6. The oxidation of claim 6 wherein said vapor mixture is contacted with the catalyst at a base velocity of from 6 to 6,000 vapor volumes per catalyst volume per hour.

7. The oxidation of claim 5 wherein the olefin is present in the vapor mixture at a volumetric ratio to nitrogen dioxide of from 1:10 to 10:1 and the alkanoic acid is present in said vapor mixture at a volumetric ratio to nitrogen dioxide of from 1:10 to 10:1.

* * * * *